March 14, 1950  V. A. VAN ORSDALE  2,500,440
MECHANICAL TRUCK AND TRAILER HOIST
Filed June 19, 1946  2 Sheets-Sheet 1
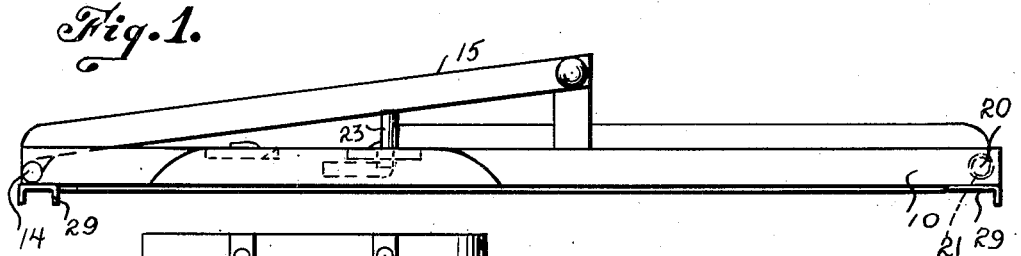
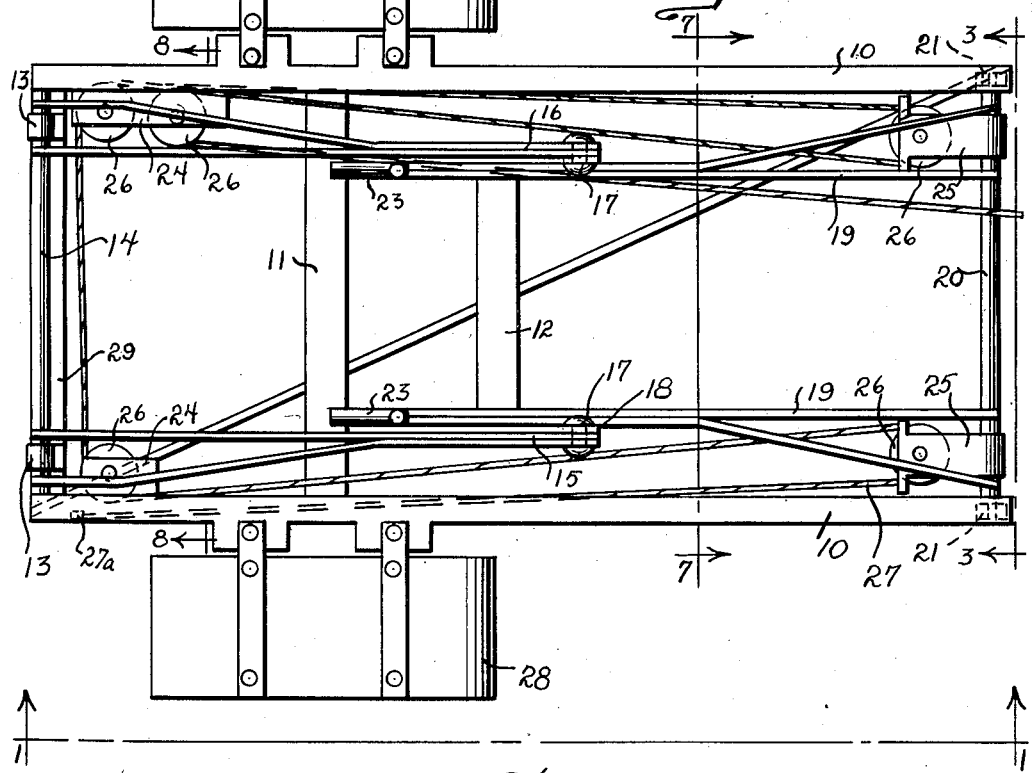
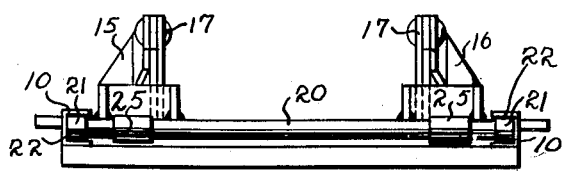
INVENTOR.
Val A. Van Orsdale
BY Victor J. Evans & Co.
ATTORNEYS March 14, 1950 V. A. VAN ORSDALE 2,500,440
MECHANICAL TRUCK AND TRAILER HOIST
Filed June 19, 1946 2 Sheets-Sheet 2
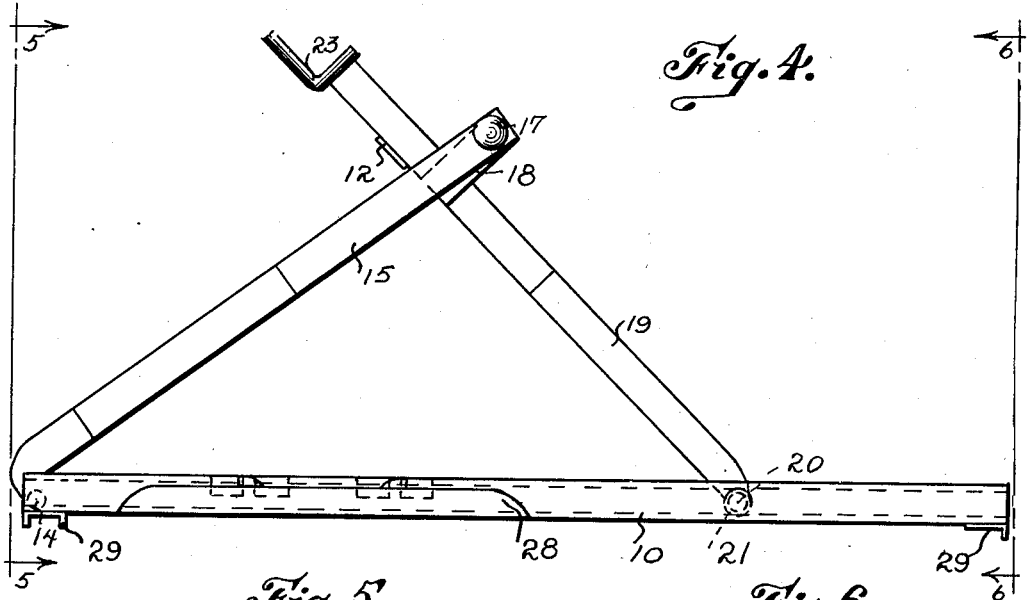
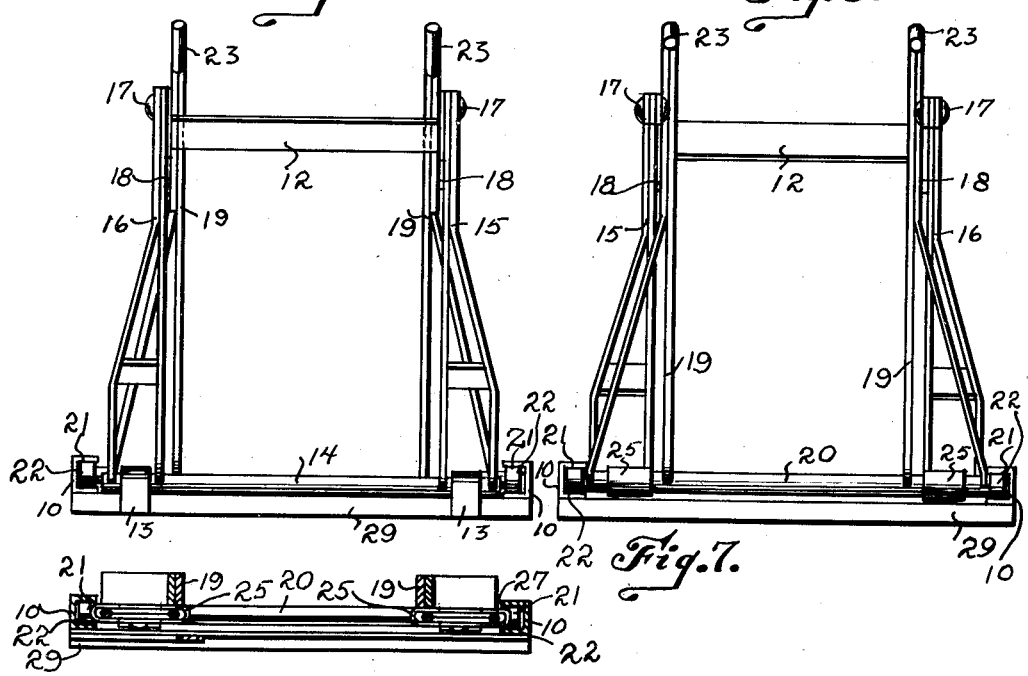
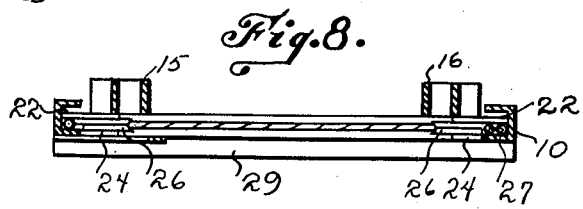
INVENTOR.
Val A. Van Orsdale
BY Victor J. Evans & Co.
ATTORNEYS Patented Mar. 14, 1950

2,500,440

UNITED STATES PATENT OFFICE 2,500,440

MECHANICAL TRUCK AND TRAILER HOIST

Val A. Van Orsdale, Hunter, N. Dak., assignor to West Fargo Manufacturing Company, West Fargo, N. Dak., a corporation of North Dakota Application June 19, 1946, Serial No. 677,814

3 Claims. (Cl. 254—128)

1

The invention relates to a hoisting apparatus, and more especially to a mechanical truck and trailer hoist.

The primary object of the invention is the provision of an apparatus of this character, wherein a truck or trailer for general farm use can be drawn onto the same, so that it can be lifted for the dumping of the load with ease and dispatch, the draft of the truck or trailer being had by a tractor or other draft medium, which also functions for the operation of the apparatus for its hoisting purposes.

Another object of the invention is the provision of an apparatus of this character, wherein it is distinguished from hydraulic hoists or lifts, and is of a size to permit the easy handling thereof by several men, it being anchored without staking thereof, to allow a loaded truck or trailer to be pulled onto the same, so that the said truck or trailer can be hoisted with dispatch under the draft medium for the loaded vehicle.

A further object of the invention is the provision of a hoist or apparatus of this character, which is simple in construction, thoroughly reliable and efficient in operation, strong, durable, possessed of few parts, thus economical in repairs and replacements, it being light in weight, for convenient portability, novel in construction and unique in assembly, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a side view of the apparatus constructed in accordance with the invention, and in a normal lowered position, as seen from line 1—1 of Figure 2.

Figure 2 is a plan view thereof;

Figure 3 is an end view at the line 3—3 of Figure 2 looking in the direction of the arrows;

Figure 4 is a view similar to Figure 1, showing the apparatus in a raised position;

Figure 5 is an end elevation looking from the line 5—5 in the direction of the arrows in Figure 4;

Figure 6 is an end view looking from the line 6—6 of Figure 4 in the direction of the arrows;

Figure 7 is a sectional view taken on the line 7—7 of Figure 2 looking in the direction of the arrows;

2

Figure 8 is a sectional view taken on the line 8—8 of Figure 2 looking in the direction of the arrows.

Similar reference characters indicate corresponding parts throughout the several views in the drawings.

Referring to the drawings in detail, the apparatus constituting the present invention, comprises a bed frame involving spaced parallel channeled side rails 10, and insert cross end rail 11, and an intermediate transverse brace rail 12, respectively, these being united in any suitable manner to give strength and rigidity to the frame in its entirety.

Hinged to one end of the frame at its side rails 10 by bearings 13 embracing a rocking shaft 14 is a double arm prop having support bars 15 and 16 which is adapted for vertical swinging movement, and the arms of this prop are pivoted at 17 to offset extensions 18 rigid on the side arms 19 of a hoisting jack. The lower ends of the arms 19 are mounted on a journal shaft or axle 20 having bearing rollers 21 on the ends and positioned to travel in channels 22 in the side rails 10 of the bed frame. The jack formed with the arms 19 at its inner end is provided with axle saddles 23.

Fixed to the side rails 10 and the end rail 11 of the frame at opposite sides thereof are stationary pulley blocks 24, while carried by the shaft or axle 20 are pulley blocks 25, these having journalled therein, pulleys 26, over which is trained an operating cable 27, one end of the latter being fixed to the frame at the point 27a of one side rail 10, while the other end is adapted for hitching to a tractor, or other draft medium, not shown, so that when the cable is pulled upon thereby, the jack will be raised, then when this cable is slackened, the said jack will become lowered.

The side rails 10 of the frame are provided with laterally disposed wheel lift blocks 28, so that when a truck or trailer of the farm type is driven onto the apparatus, that is to say, the bed frame, when the apparatus is in normal lowered condition, the wheels of the truck or trailer running onto the blocks 28 will bring the axle of the front wheels of such truck or trailer into seating position in the saddles 23 of the jack, whereupon the truck or trailer, not shown, is unhitched from the draft tractor or medium, which pulls the same onto the apparatus, and the cable 27 is then hitched to this tractor or medium, which is then drawn a short distance away from the hoist. In this movement the tractor draws the cable 27 actuating the jack 19 for hoisting the forward end of the truck or trailer, whereby the same, when loaded, can be readily dumped with ease and dispatch, it being in a position for so doing.

The bed frame is provided with ground cleats 29, for anchorage in the ground, so that the apparatus does not have to be staked or otherwise fastened to a foundation to eliminate creeping thereof when in use, it also being readily transported by several men from one locality to another with ease and readiness.

The truck or trailer is pulled by the tractor or medium onto the apparatus in the direction of the end having the prop 15, so that the front axle of the said truck or trailer will be received in the saddles as before stated. When it is desired to lower the truck or trailer, the cable is slackened, which causes the lowering of the jack 19, this being accomplished by the backing of the said tractor or draft medium, as should be obvious.

What is claimed is:

1. In a mechanical hoist, the combination which comprises a rectangular shaped bed frame having channel shaped side members connected by transversely disposed bars, a transversely disposed shaft pivotally mounted in a fixed position in one end of the frame, bearings spaced from the said side members providing mounting means for the said transversely disposed shaft, parallel supporting bars pivotally mounted on the shaft and extended upwardly therefrom, diagonally disposed side braces mounted on the sides of the said parallel support bars, and with the said parallel support bars straddling the bearings in which the shaft on which the parallel support bars are mounted is mounted, a transversely disposed sliding shaft extended across the opposite end of the frame, means slidably mounting the ends of the sliding shaft in the channel of the sides of the bed frame, parallel arms mounted on the sliding shaft and extended upwardly therefrom, diagonally disposed side braces mounted on the sides of the parallel arms and positioned with the lower ends on the sliding shaft and spaced from the lower ends of the parallel arms, axle carrying saddles on the upper ends of the parallel arms, said parallel arms having upwardly disposed extensions spaced from the upper ends thereof, means pivotally mounting the upper ends of the support bars on the extensions of the parallel arms, pulleys mounted in bearings on the sliding shaft with the bearings positioned between the lower ends of the said parallel arms and diagonally disposed side braces thereof, pulleys mounted in fixed position in the ends of the bed frame in which the fixed shaft is positioned, and a cable trained over the pulleys with one end attached to the bed frame and the other extended for attachment to a tractor or the like, said diagonally disposed side braces of the parallel support bars and arms providing lateral supports for said members.

2. A mechanical hoist as described in claim 1, having wheel tread blocks extending from the sides of the bed frame positioned to locate the axle of wheels on the blocks over the saddles of the parallel arms.

3. A mechanical hoist as described in claim 1, having channels with downwardly extending flanges on the under surface of the bed frame preventing walking of said bed frame.

VAL A. VAN ORSDALE.

REFERENCES CITED

The following references are of record in the file of this patent:

UNITED STATES PATENTS

| Number | Name | Date |
| --- | --- | --- |
| 104,003 | Farnsworth | June 7, 1870 |
| 434,701 | Conway | Aug. 19, 1890 |
| 999,665 | McCoy et al. | Aug. 1, 1911 |
| 1,315,335 | Rold | Sept. 9, 1919 |
| 1,673,394 | Carlson | June 12, 1928 |
| 2,408,376 | Craig | Oct. 1, 1946 |